March 3, 1959
L. MANCINI
2,875,644
TRANSMISSION
Filed Jan. 24, 1956
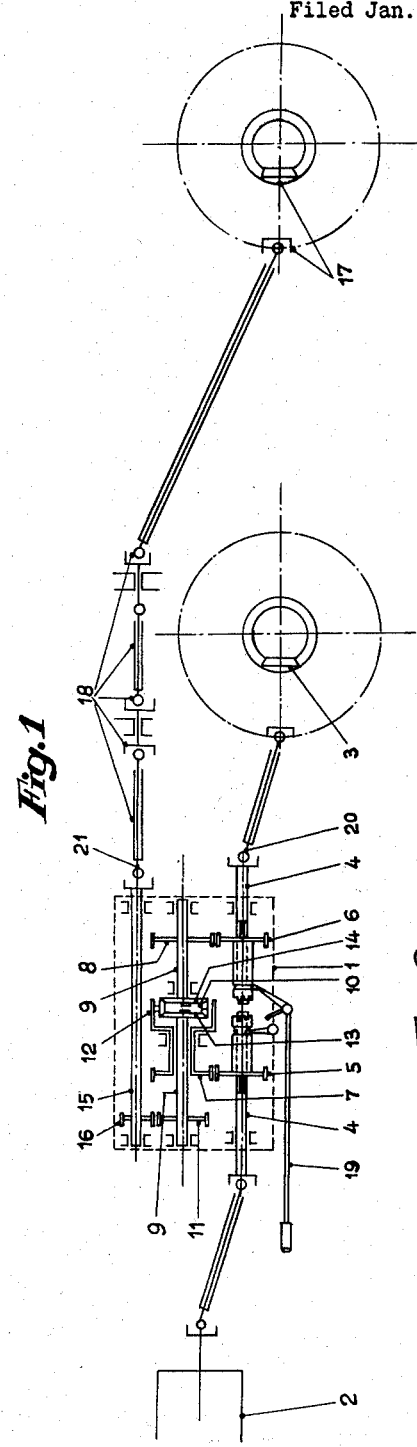
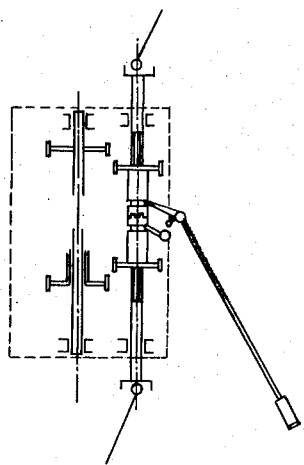

United States Patent Office 2,875,644
Patented Mar. 3, 1959

2,875,644

TRANSMISSION

Luigi Mancini, Rimini, Italy, assignor of one-half to Giuseppe Scalero, Turin, Italy Application January 24, 1956, Serial No. 561,068

Claims priority, application Italy January 24, 1955

1 Claim. (Cl. 74—665)

Drive gears have been proposed for driving one or more wheel pairs on trailers by directly taking off power on the differential or change speed gear on the tractor. Such mechanism does not, however, take care of any difference in diameter, how slight it may be, existing between the tractor and trailer wheels, or which may arise merely from differently inflated tires resulting in a different flattening thereof, which leads to unsatisfactory operation and injury to the gear members as well as loss in engine power output.

This invention relates to a device including an equalising differential through which motion can be transmitted from the tractor to the trailer by driving the trailer wheel pairs, thereby avoiding the serious drawback mentioned above and permitting coupling and uncoupling by means of a suitable crank.

The device can, for instance, be normally incorporated in the drive gear on the tractor between the change speed gear and differential, without altering or modifying the vehicle structure.

Apart from the various uses which can be made of the device and its location on the tractor, the accompanying drawing shows diagrammatically by way of example an embodiment of this invention, of which the essential component parts are shown, in which the device is located between the change speed gear and differential on the tractor.

Figure 1 is a longitudinal sectional view thereof,

Figure 2 shows the device in its inoperative condition.

The device, which is generally denoted by its casing 1, is located between the change speed gear 2 and differential 3 on the tractor and is connected to the stub axles by suitable cardan joints. Said device comprises a primary shaft 4 made up of two independent coaxial stub shafts having keyed thereto toothed wheels 5 and 6, respectively. Said wheels are axially displaceable, their simultaneous displacement towards each other effecting (a) uncoupling of the toothed wheel 5 from toothed wheel 7; (b) uncoupling of toothed wheel 6 from toothed wheel 8; (c) coupling of toothed wheel 6 with toothed wheel 5, whereby the shaft 4 and toothed wheels 5 and 6 are fixedly connected together. The device further comprises a secondary shaft 9 made up of two coaxial stub shafts connected together by an equalising differential 10 to which the two toothed wheels 11 and 8 are fixedly keyed. A wheel pair including a toothed wheel 7 and cage 12 rotate freely and independently on the left-hand stub shaft 9, the cage 12 being provided with planet gears incorporated by the equalising gear.

The equalising gear acts as a differential gear through planet wheels 10 and two sun wheels 13 and 14 fixedly secured to the stub shafts.

A third shaft 15 receiving motion through a toothed wheel 16 from the toothed wheel 11 transmits motion to the trailer axle through a differential 17 and a set of bearings and universal joints 18.

It will be apparent that transmission of motion to the trailer by driving wheel pairs on the trailer is optional and can be effected according to requirements simply by operating the lever 19, the secondary shaft and third shaft being cut off in the position of the lever 19 shown on Figure 2. On coupling of the secondary shaft, motion to the differential on the tractor and to the differential on the trailer is derived from the equalising differential which causes through stub shafts 9 the two shafts 20, 21 to rotate at different speeds in accordance with actual requirements as explained above.

It will be understood that the form and constructional details of the improved device can be varied in accordance with technical requirements and use, subject to the manner of operation described above, without departing from the scope of this invention.

What I claim is:

In a motor vehicle comprising an engine and a pair of road wheels adapted to be driven from the engine, a driving connection between the engine and the wheels, a power take-off transmission interposed in the driving connection, the said transmission comprising a pair of axially aligned stub shafts connected to the engine and wheels, respectively, a pair of toothed wheels splined on the stub shafts having each a clutch component associated therewith whereby the toothed wheels may be clutched with each other for a direct transmission of rotary movement from one stub shaft to the other and unclutched from each other, means associated with the said toothed wheels capable of simultaneously displacing the toothed wheels and associated clutch means on the respective stub shafts for clutching and unclutching the toothed wheels, a differential gearing having a rotatable planet wheel cage and a pair of sun wheels in engagement with the planet wheels of the cage, a gear fast with the cage, a gear fast with one of said sun wheels, said two gears being positioned for being respectively engaged from the said toothed wheels in unclutched condition and for being disengaged from the toothed wheels in clutched condition of the toothed wheels, and a power take-off shaft coupled with the other of said sun wheels.

References Cited in the file of this patent

FOREIGN PATENTS 731,938     Great Britain _____ June 15, 1955